(12) United States Patent
Izumi

(10) Patent No.: US 11,007,608 B2
(45) Date of Patent: May 18, 2021

(54) LASER MACHINING DEVICE WARNING OF ANOMALY IN EXTERNAL OPTICAL SYSTEM BEFORE LASER MACHINING

(71) Applicant: FANUC CORPORATION, Yamanashi (JP)

(72) Inventor: Takashi Izumi, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 98 days.

(21) Appl. No.: 16/191,615

(22) Filed: Nov. 15, 2018

(65) Prior Publication Data

US 2019/0160599 A1 May 30, 2019

(30) Foreign Application Priority Data

Nov. 24, 2017 (JP) .............................. JP2017-226213

(51) Int. Cl.
*B23K 26/02* (2014.01)
*B23K 26/70* (2014.01)
*B23K 26/06* (2014.01)
*B23K 26/60* (2014.01)
*B23K 26/067* (2006.01)

(52) U.S. Cl.
CPC .......... *B23K 26/707* (2015.10); *B23K 26/067* (2013.01); *B23K 26/0643* (2013.01); *B23K 26/0648* (2013.01); *B23K 26/60* (2015.10); *B23K 26/705* (2015.10)

(58) Field of Classification Search
CPC ............ B23K 26/0643; B23K 26/0648; B23K 26/067; B23K 26/60; B23K 26/705; B23K 26/707; B23K 26/04; B23K 26/06; B23K 26/14; B23K 26/1437; B23K 26/1438; B23K 26/1476; B23K 26/706
USPC .......................................... 219/121.6–121.83
See application file for complete search history.

(56) References Cited

U.S. PATENT DOCUMENTS 4,952,770 A * 8/1990 Hayashi ............. B23K 26/0853
219/121.67
5,463,202 A 10/1995 Kurosawa et al.
(Continued)

FOREIGN PATENT DOCUMENTS

CN 103920989 A 7/2014
CN 105312777 A 2/2016
(Continued)

*Primary Examiner* — Sang Y Paik
(74) *Attorney, Agent, or Firm* — RatnerPrestia

(57) ABSTRACT

A laser machining device includes a reflective plate disposed perpendicular to the optical axis of emitting light and having a constant reflectance to the emitting light; a return light measurement unit which measures intensity distribution of return light reflected off the reflective plate and returning to the external optical system via a beam splitter; a storage unit which stores the return light intensity distribution in a normal state as reference data; a preprocessing unit which performs processing of identifying at least one of an optical axis shift, a beam diameter anomaly, a mode anomaly, a ghost, contamination of a protective window, and a focus shift due to thermal lens effect on the basis of comparison between measurement data of the return light intensity distribution and the reference data, before laser machining; and a warning unit which warns of an anomaly in the external optical system in accordance with the preprocessing unit.

14 Claims, 10 Drawing Sheets

(56) References Cited

U.S. PATENT DOCUMENTS

| | | | | |
|---|---|---|---|---|
| 2010/0093112 A1* | 4/2010 | Takagi | ................... | B23K 26/03 |
| | | | | 438/7 |
| 2013/0258321 A1* | 10/2013 | Jurca | ................... | G01N 21/958 |
| | | | | 356/73 |
| 2018/0029164 A1* | 2/2018 | Kramer | ................ | G01J 1/0448 |

FOREIGN PATENT DOCUMENTS

| JP | 01-218788 A | 8/1989 |
|---|---|---|
| JP | 02142688 A | 5/1990 |
| JP | 2006-247681 A | 9/2006 |
| JP | 06252485 A | 2/2007 |
| JP | 2007044739 A | 2/2007 |
| JP | 2008-210977 A | 9/2008 |
| JP | 2009-039779 A | 2/2009 |
| JP | 2012-179627 A | 9/2012 |
| JP | 2016002580 A | 1/2016 |
| JP | 2016-097412 A | 5/2016 |
| JP | 2016-530611 A | 9/2016 |
| JP | 2016203232 A | 12/2016 |

* cited by examiner

LASER MACHINING DEVICE WARNING OF ANOMALY IN EXTERNAL OPTICAL SYSTEM BEFORE LASER MACHINING

CROSS-REFERENCE TO RELATED APPLICATION

This application is a new U.S. Patent Application that claims benefit of Japanese Patent Application No. 2017-226213, filed Nov. 24, 2017 for all purposes.

BACKGROUND OF THE INVENTION

1. Field of the Invention

The present invention relates to a laser machining device, and particularly relates to a laser machining device configured to warn of an anomaly in an external optical system before laser machining.

2. Description of the Related Art

A focus position is preliminarily set on the basis of a material to be subjected to laser cutting, a thickness, and the like, and then laser machining is performed. In a case where machining problems occur, an external optical system configured to emit output beam from a laser oscillator toward a workpiece is checked for contamination, or contamination of the external optical system is detected with a temperature sensor or a scattered light sensor mounted in the external optical system.

Techniques disclosed in the following documents, for example, are known as those related to the present application. JP 2009-039779 A discloses a laser machining device configured to evaluate welding quality without being affected by foreign matter adhered to a protective glass. This laser machining device take a difference between a power monitoring image obtained by reflection of laser beam radiated to an irradiation board via the protective glass and a welding image obtained by reflection of laser beam radiated to a workpiece via the protective glass in welding, to obtain a difference processing reflected light image that do not include any images of the foreign matter adhered to the protective glass, and evaluates welding quality from the difference processing reflected light image.

JP 2016-097412 A discloses a laser welding method easily restraining poor welding when spatters adhere to a protective glass. This laser welding method radiates an inspecting laser beam having smaller output to a welding portion, receives a returning return light via a mirror, compares the intensity of the return light with a standard intensity, calculates the amount of decrease in the laser output and the amount of focal deviation, and adjusts the output of a laser oscillator and a focal length, before performing laser welding.

JP 01-218788 A discloses a laser machine having a function to correct relative difference between the focus position of a laser beam and the machining position of a workpiece. This laser machine captures an image of the machining position with a television camera via a switching mirror, detects the amount of relative difference between a preliminarily set focus position and the machining position, and adjusts the machining position to the focus position.

JP 2008-210977 A discloses a light source device including a CCD camera for observing the intensity distribution of laser beam output from a laser beam source via a beam splitter.

JP 2006-247681 A discloses a monitoring device for laser machining capable of appropriate in-line monitoring of the state of an optical component and the state of laser output at a machining point. This monitoring device includes a laser beam detector detecting, via a bent mirror, the light intensity of a laser beam emitted from a terminal surface of an optical fiber, a reflected light detector detecting the intensity of light reflected off a laser radiation unit from a machining point of a workpiece, and a first determination section determining the state of an optical component on the basis of the intensity of the laser beam and the intensity of the reflected light.

JP 2012-179627 A discloses a method for detecting laser output and return light in a fiber laser machine. This fiber laser machine causes bend mirror transmitting light of a laser beam emitted from a process fiber and bend mirror transmitting light of return light from a machining portion to be incident on a first absorber and a second absorber, respectively, and detects scattered light from the first absorber and the second absorber with a first photoelectric conversion element and a second photoelectric conversion element, respectively.

JP 2016-530611 A discloses a system for evaluating a state of a process. This system radiates an output laser beam to a workpiece via a one-way mirror which is translucent, receives reflected light reflected off the one-way mirror with a camera, and evaluates machining quality.

SUMMARY OF THE INVENTION

An external optical system degrades over time. A loss of laser power occurs at the beam focus position as a result. Even slight contamination causes an optical axis shift, a beam diameter anomaly, a mode anomaly (intensity distribution anomaly), a focus shift due to thermal lens effect, and the like, and thus the quality of laser machining is significantly degraded. In this case, it is necessary to quickly replace or clean the optical components. However, there is a problem with maintenance of optical components after machining problems have occurred in that many defective products are produced when carrying out automated operations.

Components, such as a lens and a protective window, are replaced in maintenance of the external optical system, and the replaced components are checked whether to meet specifications by performing laser machining. However, in a case where an anti-reflective (AR) coating of the lens, the protective window, or the like has a defect, strong reflected light is generated in laser machining, and the external optical system may be damaged.

Therefore, there is a need for a technique accurately warning of various anomalies caused by an external optical system before laser machining.

One aspect of the present disclosure provides a laser machining device configured to warn of an anomaly in an external optical system before laser machining, the laser machining device including: a laser oscillator; an external optical system configured to guide output light in a forward direction from the laser oscillator via a beam splitter to radiate the light to a surface of a workpiece; a reflective plate disposed perpendicular to an optical axis of emitting light emitting from the external optical system, the reflective plate having a constant reflectance to the emitting light; a return light measurement unit configured to measure intensity distribution of return light reflected off the reflective plate and returned to the external optical system via the beam splitter; a storage unit configured to store the intensity distribution of the return light in a normal state of the external optical system as reference data; a preprocessing unit configured to perform processing of identifying at least one of an optical axis shift, a beam diameter anomaly, a mode anomaly, a ghost, contamination of a protective window, and a focus shift due to thermal lens effect caused by the external optical system on a basis of comparison between measurement data of the intensity distribution of the return light and the reference data, before laser machining; and a warning unit configured to warn of an anomaly in the external optical system in accordance with the preprocessing unit.

DETAILED DESCRIPTION

Figure 1:
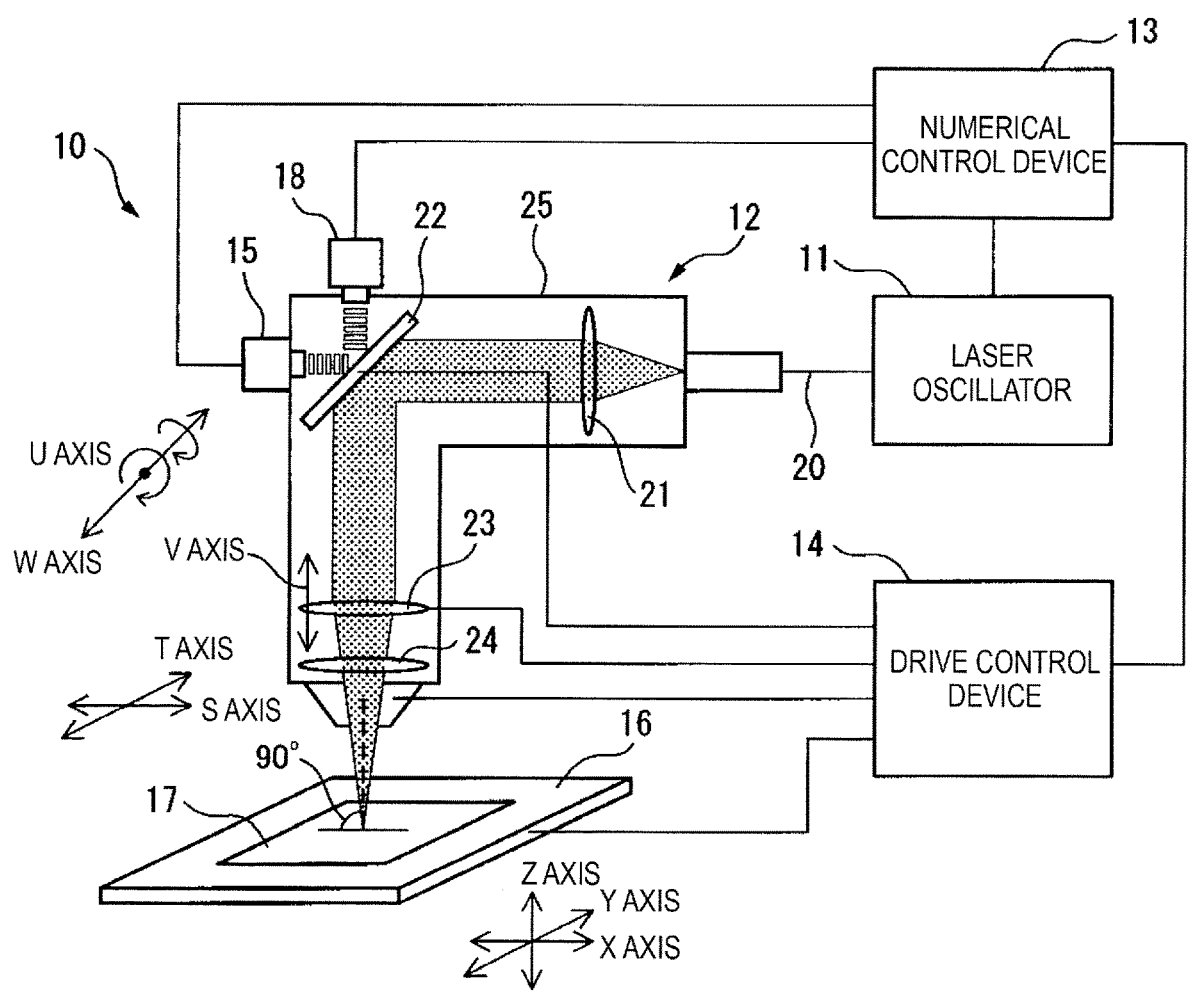
FIG. 1 is a schematic diagram illustrating a simplified configuration of a laser machining device according to one embodiment.

Embodiments of the present disclosure will be described in detail below with reference to the accompanying drawings. In the drawings, identical or similar constituent elements are given identical or similar reference signs. Additionally, the embodiments described below are not intended to limit the technical scope of the invention or the meaning of terms set forth in the claims.

FIG. 1 is a schematic diagram illustrating a simplified configuration of a laser machining device according to the present embodiment. The laser machining device 10 includes a laser oscillator 11, an external optical system 12 guiding output light in a forward direction from the laser oscillator 11 to radiate the light to a surface of a workpiece, a numerical control device 13 configured to control the entire laser machining device 10, and a drive control device 14 configured to control drive of the laser machining device 10. The laser oscillator 11 is a fiber laser oscillator having a wavelength from 1060 to 1080 nm, for example. The external optical system 12 includes a fiber 20, a collimation lens 21 configured to convert output light from the fiber 20 into parallel light, a beam splitter 22 configured to reflect one portion of the output light or return light and transmit the other portion, a focusing lens 23 configured to focus the output light, and a protective window 24 configured to protect the external optical system 12. The drive control device 14 includes an X axis, a Y axis, and a Z axis along which a machining table 16 is moved, a V axis along which the position of the focusing lens 23 is moved in an optical axis direction, an S axis and a T axis along which the protective window 24 is moved in directions orthogonal to the optical axis, a U axis and a W axis about which the angle of the beam splitter 22 is adjusted, and a servo motor, a control section, and the like configured to drive along and about each of the axes.

The laser machining device 10 further includes an output light measurement unit 15 configured to measure, via the beam splitter 22, intensity distribution of the output light in the forward direction from the laser oscillator 11, a reflective plate 17 disposed in a desired position on the machining table 16 or outside the machining table 16, and a return light measurement unit 18 configured to measure, via the beam splitter 22, intensity distribution of return light reflected off the reflective plate 17 and returning to the external optical system. The reflective plate 17 is, for example, a flat and smooth mirror or copper plate, is disposed perpendicular to the optical axis of emitting light emitting from the external optical system 12, and has a constant reflectance to the emitting light (e.g., a reflectance of approximately 98% to a laser beam having a wavelength from 1060 to 1080 nm). The beam splitter 22 is disposed tilted having an angle of 45° with respect to the optical axis at a bent part between the collimation lens 21 and the focusing lens 23 in an L-shaped machining head 25. The output light measurement unit 15 is disposed in a position at an angle of 0° with respect to the optical path of the output light in the forward direction, the return light measurement unit 18 is disposed in a position at an angle of 90° with respect to the optical path of the output light in the forward direction, and each of these units includes a CCD camera or a CMOS camera, or a two-dimensionally aligned photoelectric element or the like. In an alternative embodiment, the beam splitter 22 may be disposed between the collimation lens 21 and the focusing lens 23 in a straight machining head. In this case, the output light measurement unit 15 is disposed in a position at an angle of 90° with respect to the optical path of the output light in the forward direction.

Figure 2:
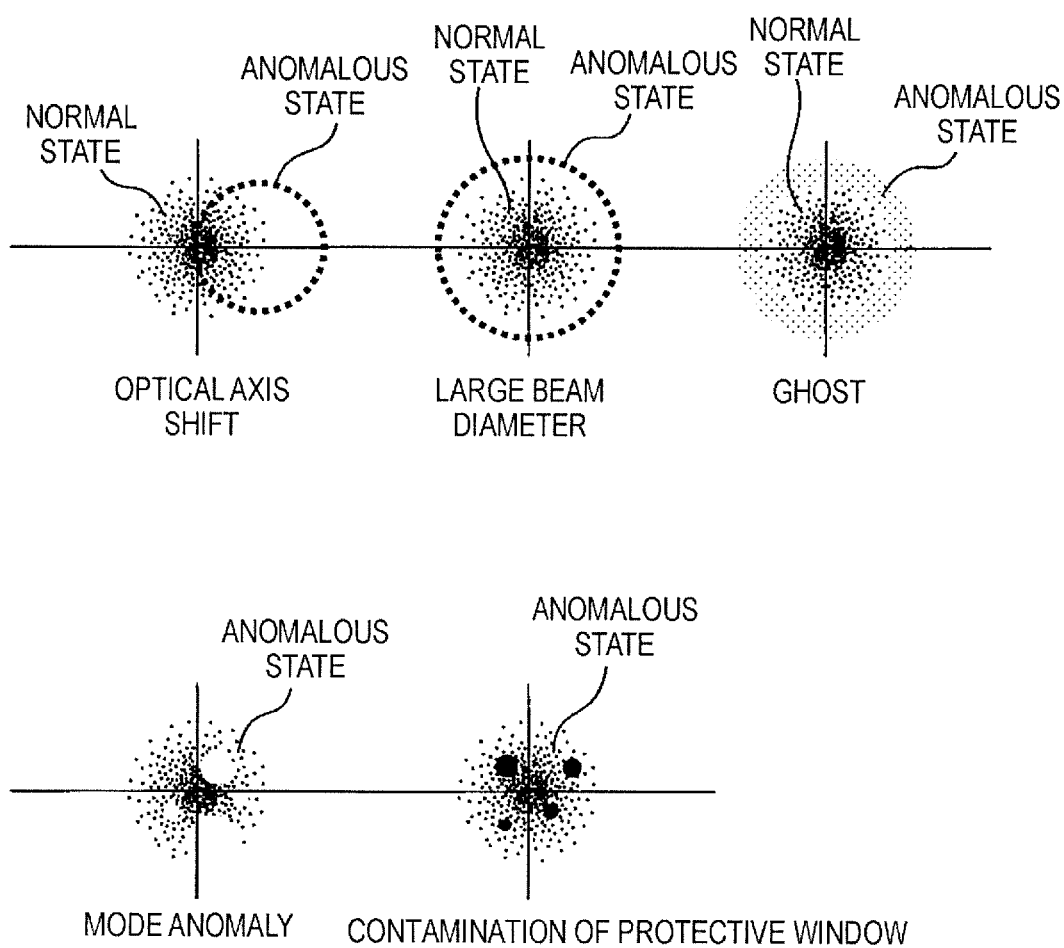
FIG. 2 is a cross-sectional view illustrating intensity distribution of return light in a normal state and an anomalous state.

FIG. 2 is a cross-sectional view illustrating intensity distribution of emitting light in a normal state and an anomalous state. When the laser machining device 10 emits a laser beam toward the reflective plate 17, with the external optical system 12 in a normal state (with no position shift, angle shift, contamination, lack of an AR coat, or the like), no anomaly, such as an optical axis shift, a beam diameter anomaly, a ghost, a mode anomaly, and contamination of the protective window, is observed in the intensity distribution of the return light measured by the return light measurement unit 18; however, with the external optical system 12 having an anomaly (such as a position shift, an angle shift, contamination, and lack of an AR coat), an anomaly, such as an optical axis shift, a beam diameter anomaly, a ghost, a mode anomaly, and contamination of the protective window, is observed in the intensity distribution of the return light measured by the return light measurement unit 18. The laser machining device 10 of the present embodiment accurately warns of various anomalies in the external optical system 12 before laser machining on the basis of the intensity distribution of the return light measured by the return light measurement unit 18 and the intensity distribution of the output light measured by the output light measurement unit 15.

Figure 3:
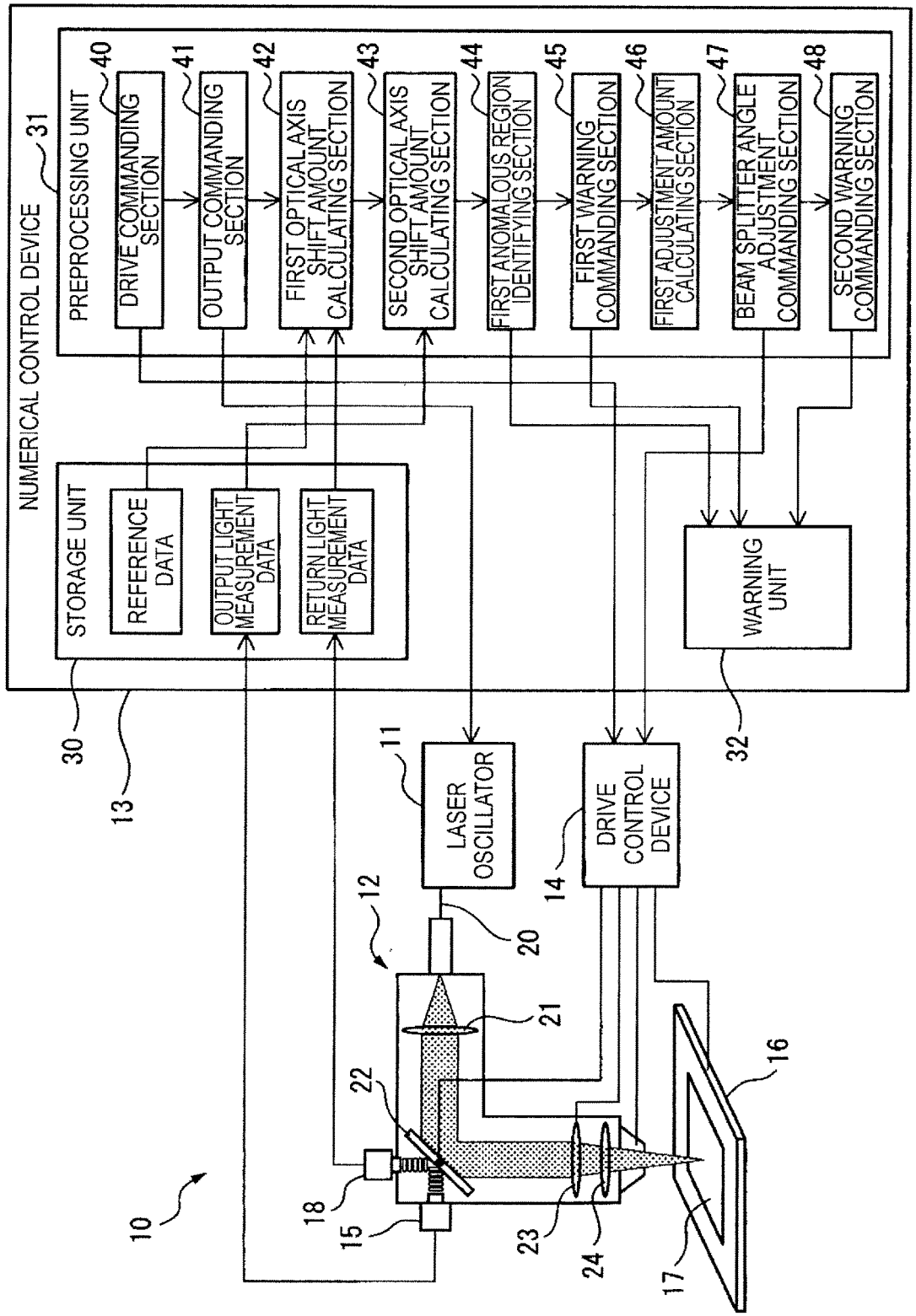
FIG. 3 is a block diagram illustrating a configuration of a numerical control device according to a first embodiment.

FIG. 3 is a block diagram illustrating a configuration of a numerical control device according to a first embodiment. The numerical control device 13 includes a storage unit 30 composed of a RAM, a ROM, a nonvolatile memory, or the like storing various pieces of data, a preprocessing unit 31 composed of a CPU, an ASIC, an FPGA, or the like, and a warning unit 32 composed of a display panel, a speaker, an output interface, and the like. The storage unit 30, the preprocessing unit 31, and the warning unit 32 is mutually connected via a bus or the like. The preprocessing unit 31 is configured to perform processing of identifying an anomaly (optical axis shift) in the external optical system 12, and the warning unit 32 is configured to warn of the anomaly in the external optical system 12 in accordance with the processing at the preprocessing unit 31.

The storage unit 30 preliminarily stores reference data indicating the intensity distribution of the return light in the normal state of the external optical system 12 (see FIG. 2). The storage unit 30 further stores output light measurement data indicating the intensity distribution of the output light measured by the output light measurement unit 15 and return light measurement data indicating the intensity distribution of the return light measured by the return light measurement unit 18.

The constituent element of the preprocessing unit 31 is implemented by an integrated circuit composed of a CPU-executable program module, an ASIC, an FPGA, or the like. The preprocessing unit 31 includes a drive commanding section 40 configured to command the drive control device 14 to move the optical axis of the emitting light onto the reflective plate 17, and an output commanding section 41 configured to command the laser oscillator 11 to output a laser beam.

The preprocessing unit 31 further includes a first optical axis shift amount calculating section 42 configured to calculate the amount of a first optical axis shift on the basis of comparison between the return light measurement data and the reference data, a first adjustment amount calculating section 46 configured to calculate a first adjustment amount for angle adjustment of the beam splitter 22 (adjustment of angles of rotation about the U axis and the W axis) by the drive control device 14 on the basis of the first optical axis shift amount, a beam splitter angle adjustment commanding section 47 configured to command the first adjustment amount to the drive control device 14, and a second warning commanding section 48, in a case where there is still an optical axis shift after the angle adjustment of the beam splitter, configured to command the warning unit 32 to warn of an excess optical axis shift. In an alternative embodiment, the laser machining device 10 may further include an angle adjustment mechanism (not illustrated) for manual adjustment of the angle of the beam splitter 22. In this case, the warning unit 32 warns of an optical axis shift together with the first adjustment amount calculated by the first adjustment amount calculating section 46. An operator uses the angle adjustment mechanism to manually adjust the angle of the beam splitter 22 on the basis of the first adjustment amount. In this alternative embodiment, the beam splitter angle adjustment commanding section 47 is not an essential constituent element.

The preprocessing unit 31 may further include a second optical axis shift amount calculating section 43 configured to calculate the amount of a second optical axis shift on the basis of comparison between the output light measurement data and the reference data, a first anomalous region identifying section 44 configured to identify an anomalous region of the external optical system 12 on the basis of the first optical axis shift amount and the second optical axis shift amount, and a first warning commanding section 45 configured to command the warning unit 32 to warn of the anomalous region. The anomalous region identified by the first anomalous region identifying section 44 includes the beam splitter 22 itself, or one or a plurality of optical components upstream or downstream from the beam splitter 22.

Figure 4:
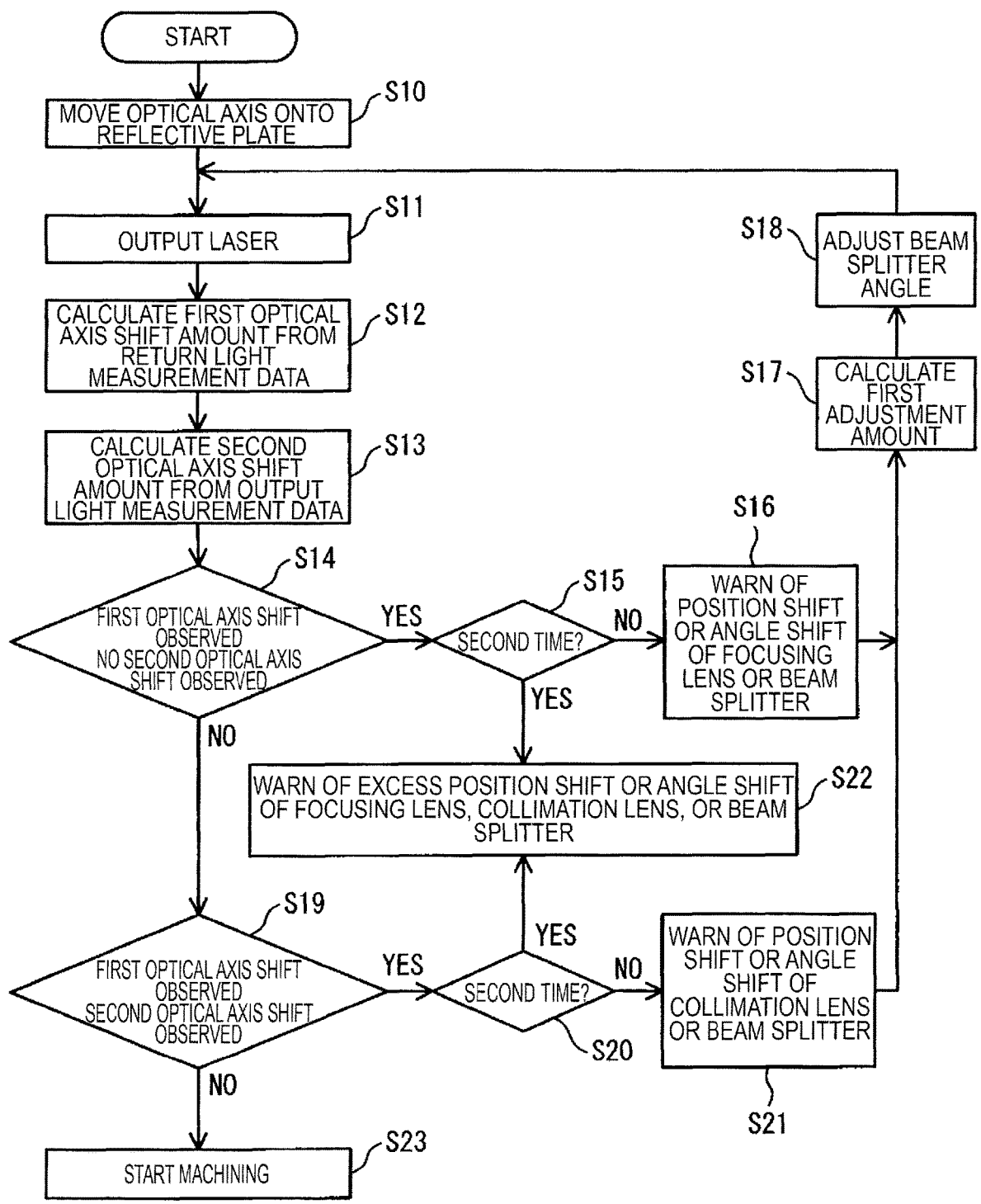
FIG. 4 is a flowchart illustrating operations of a laser machining device according to the first embodiment.

FIG. 4 is a flowchart illustrating operations of the laser machining device 10 according to the first embodiment. When processing of warning of an anomaly (optical axis shift) in the external optical system 12 starts before laser machining, a command to move the optical axis of the emitting light onto the reflective plate 17 is issued in Step S10. In Step S11, a command to output a laser beam is issued. In Step S12, the first optical axis shift amount is calculated on the basis of comparison between the return light measurement data and the reference data. In Step S13, the second optical axis shift amount is calculated on the basis of comparison between the output light measurement data and the reference data.

In Step S14 and Step S19, the anomalous region of the external optical system 12 is identified. That is, if there is the first optical axis shift and no second optical axis shift (YES in Step S14), the first optical axis shift is highly likely to have occurred because of a position shift or an angle shift of the beam splitter 22 itself or an optical component downstream from the beam splitter 22 (i.e., the focusing lens 23), so that after it is determined whether the loop is for the second time in Step S15 (NO in Step S15), a warning message about the position shift or the angle shift of the focusing lens 23 or the beam splitter 22 is issued in Step S16. Next, if there is the first optical axis shift and also the second optical axis shift (YES in Step S19), the second optical axis shift is highly likely to have occurred because of a position shift or an angle shift of the beam splitter 22 itself or an optical component upstream from the beam splitter 22 (i.e., the collimation lens 21), so that after it is determined whether the loop is for the second time in Step S20 (NO in Step S20), a warning message about the position shift or the angle shift of the collimation lens 21 or the beam splitter 22 is issued in Step S21. Note that whether there is an optical axis shift is determined by determining whether the optical axis position of the return light or the output light is within an allowable range based on an optical axis position in the reference data.

In Step S14 and Step S19, if there is no first optical axis shift (NO in Step S14 and Step S19), the laser machining device 10 starts laser machining in Step S23.

In Step S17, the first adjustment amount for angle adjustment of the beam splitter (adjustment of angles of rotation about the U axis and the W axis) is calculated on the basis the first optical axis shift amount. In Step S18, a command to adjust the angle of the beam splitter is issued, or an operator manually adjusts the angle of the beam splitter. Then, in order to check whether the correction is appropriate, the procedure goes back to Step S11, and a command to output a laser beam toward the reflective plate 17 is issued again.

In Step S14 or Step S19, if there is still the first optical axis shift (YES in Step S14 or Step S19), a warning message about an excess position shift or angle shift of the focusing lens, the collimation lens, or the beam splitter is issued in Step S22 because the loop is for the second time (YES in Step S15 or Step S20). In this case, maintenance of the focusing lens, the collimation lens, or the beam splitter is promoted.

In Step S14 and Step S19, if there is no first optical axis shift (NO in Step S14 and Step S19), the angle adjustment of the beam splitter 22 is appropriate, and the laser machining device 10 starts laser machining in Step S23.

According to the first embodiment, a warning message about an optical axis shift caused by the external optical system 12 can be accurately issued before laser machining. Thus, automated operations can be continued without producing many machining defective products. Furthermore, if the correction can be made, the time of maintenance of the external optical system 12 can be delayed.

Figure 5:
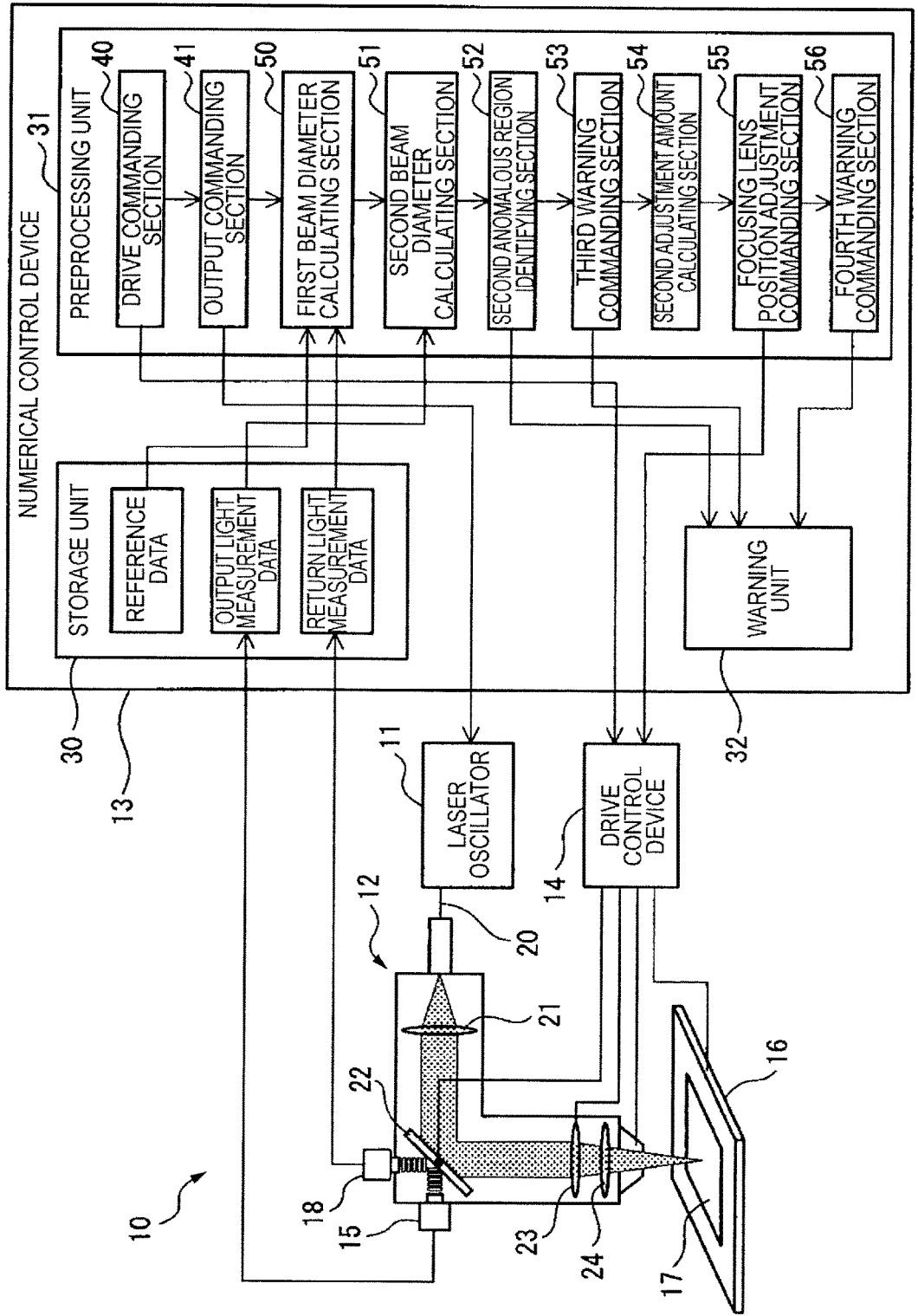
FIG. 5 is a block diagram illustrating a configuration of a numerical control device according to a second embodiment.

FIG. 5 is a block diagram illustrating a configuration of a numerical control device according to a second embodiment. Only constituent elements different from those of the numerical control device 13 according to the first embodiment will be described below. The preprocessing unit 31 is configured to perform processing of identifying an anomaly (beam diameter anomaly) in the external optical system 12, and the warning unit 32 is configured to warn of the anomaly in the external optical system 12 in accordance with the processing at the preprocessing unit 31.

The preprocessing unit 31 further includes a first beam diameter calculating section 50 configured to calculate a first beam diameter on the basis of comparison between the return light measurement data and the reference data, a second adjustment amount calculating section 54 configured to calculate a second adjustment amount for position adjustment of the focusing lens 23 (adjustment of the position along the V axis or the Z axis) by the drive control device 14 on the basis of the first beam diameter, a focusing lens position adjustment commanding section 55 configured to command the drive control device 14 to adjust the position of the focusing lens 23 on the basis of the second adjustment amount, and a fourth warning commanding section 56, in a case where there is still a beam diameter anomaly after the position adjustment of the focusing lens 23, configured to command the warning unit 32 to warn of an excess beam diameter anomaly.

The preprocessing unit 31 may further include a second beam diameter calculating section 51 configured to calculate a second beam diameter on the basis of comparison between the output light measurement data and the reference data, a second anomalous region identifying section 52 configured to identify an anomalous region of the external optical system 12 on the basis of the first beam diameter and the second beam diameter, and a third warning commanding section 53 configured to command the warning unit 32 to warn of the anomalous region. The anomalous region identified by the second anomalous region identifying section 52 includes the beam splitter 22 itself, or one or a plurality of optical components upstream or downstream from the beam splitter 22.

Figure 6:
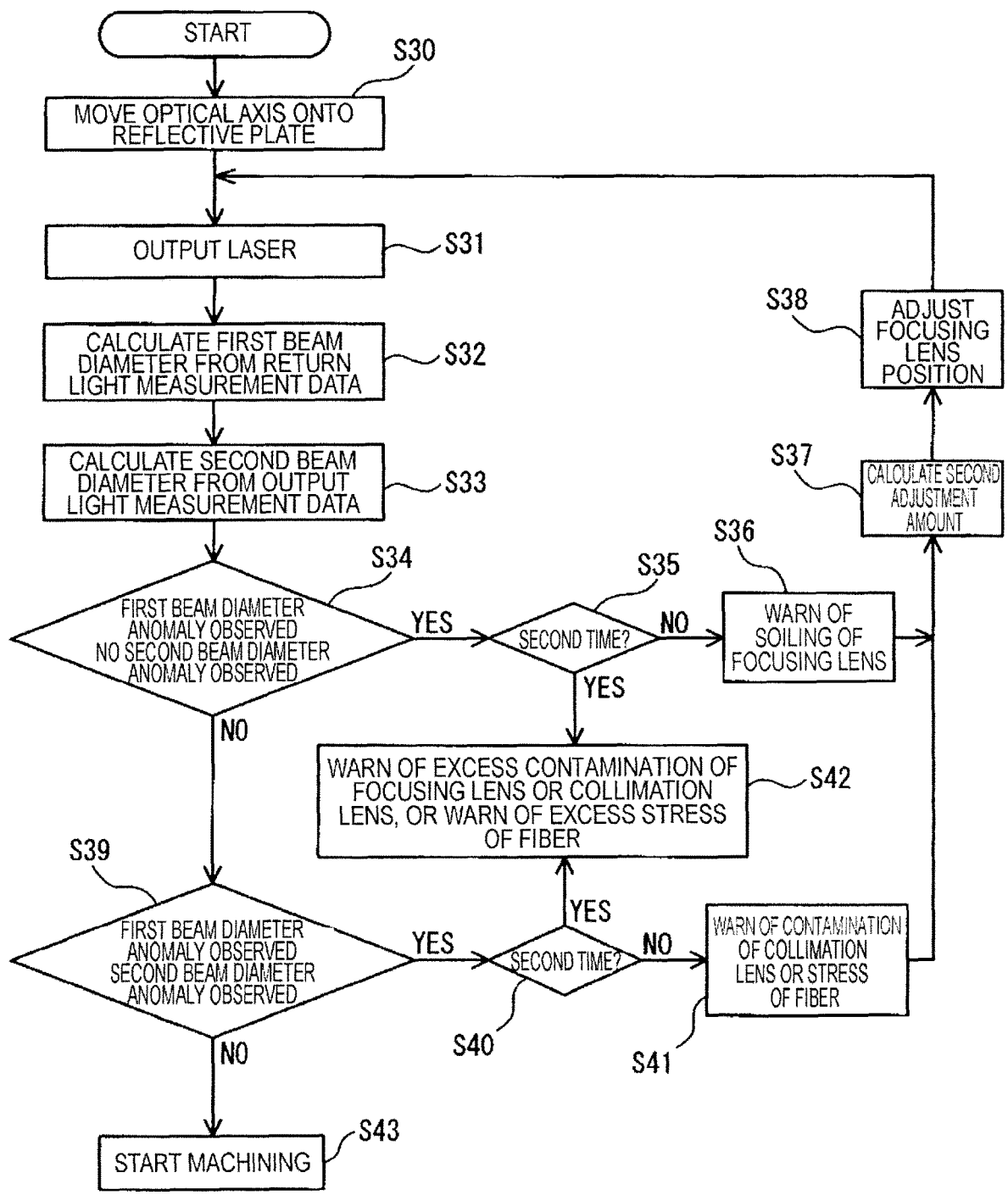
FIG. 6 is a flowchart illustrating operations of a laser machining device according to the second embodiment.

FIG. 6 is a flowchart illustrating operations of the laser machining device 10 according to the second embodiment. When processing of warning of an anomaly (beam diameter anomaly) in the external optical system 12 starts before laser machining, a command to move the optical axis of the emitting light onto the reflective plate 17 is issued in Step S30. In Step S31, a command to output a laser beam is issued. In Step S32, the first beam diameter is calculated on the basis of comparison between the return light measurement data and the reference data. In Step S33, the second beam diameter is calculated on the basis of comparison between the output light measurement data and the reference data.

In Step S34 and Step S39, the anomalous region of the external optical system 12 is identified. That is, if there is a first beam diameter anomaly and no second beam diameter anomaly (YES in Step S34), the first beam diameter anomaly is highly likely to have occurred because of contamination of the beam splitter 22 itself or an optical component downstream from the beam splitter 22 (i.e., the focusing lens 23), so that after it is determined whether the loop is for the second time in Step S35 (NO in Step S35), a warning message about contamination of the focusing lens 23 is issued in Step S36. Next, if there is the first beam diameter anomaly and also the second beam diameter anomaly (YES in Step S39), the second beam diameter anomaly is highly likely to have occurred because of stress or contamination of the beam splitter 22 itself or an optical component upstream from the beam splitter 22 (i.e., the fiber 20, the collimation lens 21), so that after it is determined whether the loop is for the second time in Step S40 (NO in Step S40), a warning message about contamination of the collimation lens 21 or stress of the fiber 20 is issued in Step S41. Note that whether there is a beam diameter anomaly is determined by determining whether the beam diameter of the return light or the output light is within an allowable range based on a beam diameter in the reference data.

In Step S34 and Step S39, if there is no first beam diameter anomaly (NO in Step S34 and Step S39), the laser machining device 10 starts laser machining in Step S43.

In Step S37, the second adjustment amount for position adjustment of the focusing lens 23 (adjustment of the position along the V axis or the Z axis) is calculated on the basis of the first beam diameter. In Step S38, a command to adjust the position of the focusing lens 23 is issued. Then, in order to check whether the correction is appropriate, the procedure goes back to Step S31, and a command to output a laser beam toward the reflective plate 17 is issued again.

In Step S34 or Step S39, if there is still the first beam diameter anomaly (YES in Step S34 or Step S39), a warning message about excess contamination of the focusing lens or the collimation lens or excess stress of the fiber is issued in Step S42 because the loop is for the second time (YES in Step S35 or Step S40). In this case, cleaning or replacement of the focusing lens, the collimation lens, or the fiber is promoted.

In Step S34 and Step S39, if there is no first beam diameter anomaly (NO in Step S34 and Step S39), the position adjustment of the focusing lens 23 is appropriate, and the laser machining device 10 starts laser machining in Step S43.

According to the second embodiment, a warning message about a beam diameter anomaly caused by the external optical system 12 can be accurately issued before laser machining. Thus, automated operations can be continued without producing many machining defective products. Furthermore, if the correction can be made, the time of maintenance of the external optical system 12 can be delayed.

Figure 7:
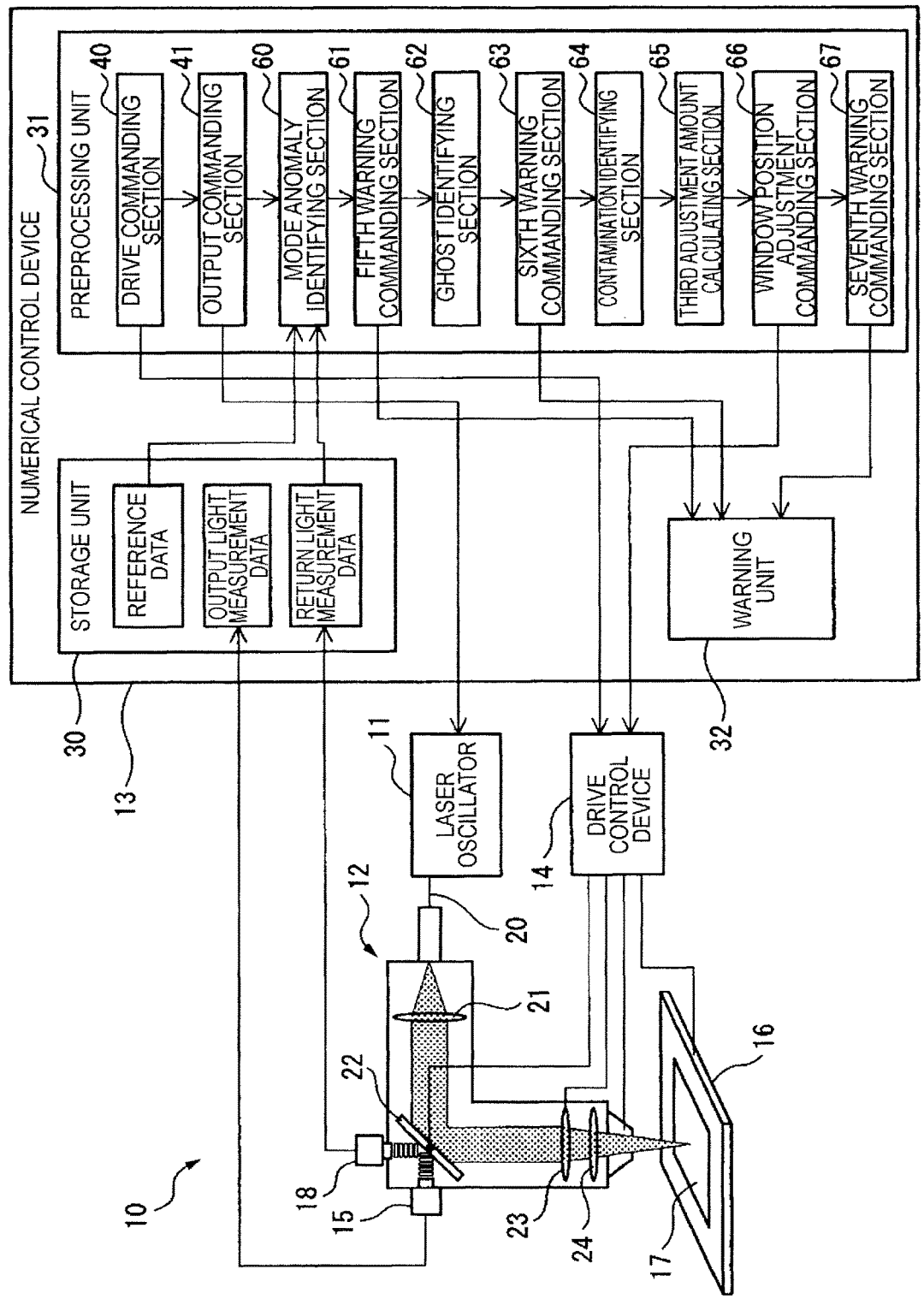
FIG. 7 is a block diagram illustrating a configuration of a numerical control device according to a third embodiment.

FIG. 7 is a block diagram illustrating a configuration of a numerical control device according to a third embodiment. Only constituent elements different from those of the numerical control device 13 according to the second embodiment will be described below. The preprocessing unit 31 is configured to perform processing of warning of an anomaly (a mode anomaly (intensity distribution anomaly), a ghost (lack of an AR coating), and contamination of the protective window) in the external optical system 12, and the warning unit 32 is configured to warn of the anomaly in the external optical system 12 in accordance with the processing at the preprocessing unit 31.

The preprocessing unit 31 further includes a mode anomaly identifying section 60 configured to identify a mode anomaly on the basis of comparison between the return light measurement data and the reference data, and a fifth warning commanding section 61 configured to command the warning unit 32 to warn of the mode anomaly. The mode anomaly is identified in a case where the pattern of a mode (intensity distribution) of the return light measurement data is outside an allowable range based on a pattern of a mode (intensity distribution) in the reference data.

The preprocessing unit 31 may further include a ghost identifying section 62 configured to identify a ghost of the return light (lack of an AR coating) on the basis of comparison between the return light measurement data and the reference data, and a sixth warning commanding section 63 configured to command the warning unit 32 to warn of the ghost. The ghost is identified in a case where the intensity of the return light in a region larger than the beam diameter in the reference data is slightly observed and is outside an allowable range.

The preprocessing unit 31 may further include a contamination identifying section 64 configured to identify contamination of the protective window 24 on the basis of comparison between the return light measurement data and the reference data, and a seventh warning commanding section 67 configured to command the warning unit 32 to warn of the contamination of the protective window 24. The contamination of the protective window 24 is identified in a case where the intensity of the return light at a specific point is relatively high and is outside an allowable range. The preprocessing unit 31 may further include a third adjustment amount calculating section 65 configured to calculate a third adjustment amount for position adjustment of the protective window (adjustment of the position along the S axis or the T axis) by the drive control device 14 on the basis of the contamination position of the protective window 24, and a window position adjustment commanding section 66 configured to command the drive control device 14 to adjust the position of the protective window 24 on the basis of the third adjustment amount.

Figure 8:
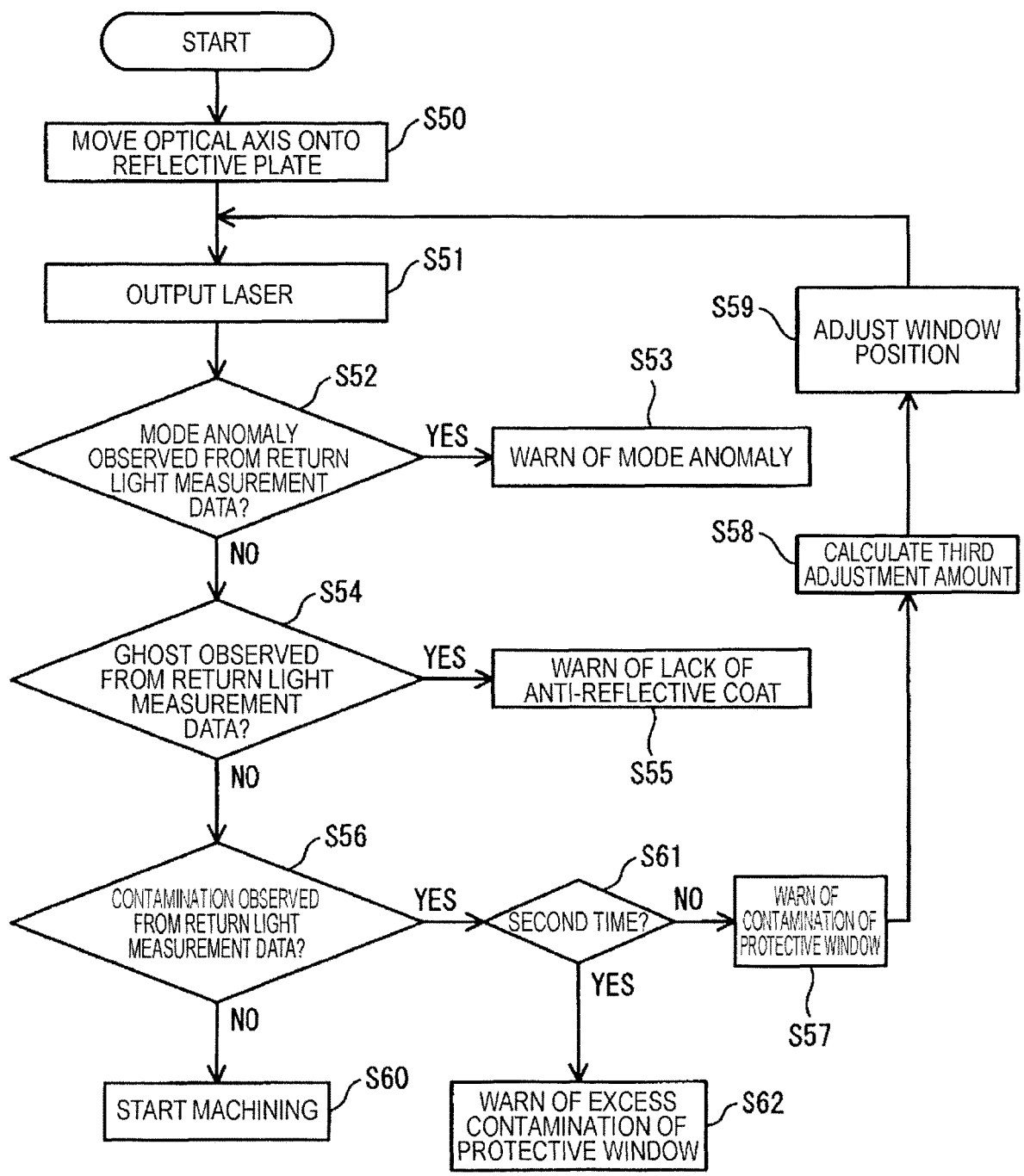
FIG. 8 is a flowchart illustrating operations of a laser machining device according to the third embodiment.

FIG. 8 is a flowchart illustrating operations of the laser machining device 10 according to the third embodiment. When processing of warning of an anomaly (a mode anomaly, a ghost (lack of an AR coating), and contamination of the protective window) in the external optical system 12 starts before laser machining, a command to move the optical axis of the emitting light onto the reflective plate 17 is issued in Step S50. In Step S51, a command to output a laser beam is issued. In Step S52, whether the return light has a mode anomaly is identified on the basis of comparison between the return light measurement data and the reference data. If there is a mode anomaly (YES in Step S52), a warning message about the mode anomaly is issued in Step S53. In this case, cleaning or replacement of the external optical system 12 is promoted. On the other hand, if there is no mode anomaly (NO in Step S52), the procedure proceeds to Step S54. Note that whether there is a mode anomaly is determined by determining whether the pattern of a mode (intensity distribution) of the return light measurement data is within the allowable range based on the pattern of the mode (intensity distribution) in the reference data.

In Step S54, whether there is a ghost is identified on the basis of comparison between the return light measurement data and the reference data. If there is a ghost (YES in Step S54), a warning message about lack of an AR coat (about the ghost) is issued in Step S55. In this case, replacement of the protective window 24 is promoted. On the other hand, if there is no ghost (NO in Step S54), the procedure proceeds to Step S56. Note that whether there is a ghost is identified by determining whether the intensity of the return light in the region larger than the beam diameter in the reference data is slightly observed and is outside the allowable range.

In Step S56, whether there is contamination of the protective window 24 is identified on the basis of comparison between the return light measurement data and the reference data. If there is contamination (YES in Step S56), it is determined whether the loop is for the second time (NO in Step S61), and then a warning message about the contamination of the protective window 24 is issued in Step S57. In this case, cleaning or replacement of the protective window 24 is promoted. On the other hand, if there is no contamination (NO in Step S56), the protective window 24 has no contamination, so that the laser machining device 10 starts laser machining in Step S60. Note that whether there is contamination is identified by determining whether the intensity of the return light at the specific point is relatively high and is outside the allowable range.

In Step S58, the third adjustment amount for position adjustment of the protective window 24 (adjustment of the position along the S axis or the T axis) is calculated, and in Step S59, the position of the protective window is adjusted. Then, to check whether the correction is appropriate, the procedure goes back to Step S51, and a command to output a laser beam toward the reflective plate 17 is issued again.

In Step S56, if there is no contamination of the protective window 24 (NO in Step S56), the position adjustment of the protective window 24 is appropriate, and the laser machining device 10 starts laser machining in Step S60. In Step S56, if there is contamination (YES in Step S56), a warning message about excess contamination of the protective window 24 is issued (Step S62) because the loop is for the second time (YES in Step S61).

According to the third embodiment, a warning message about various anomalies (a mode anomaly, a ghost (lack of an AR coating), and contamination of the protective window 24) caused by the external optical system 12 can be accurately issued before laser machining. Thus, automated operations can be continued without producing many machining defective products. Furthermore, if the correction can be made, the time of maintenance of the external optical system 12 can be delayed.

Figure 9:
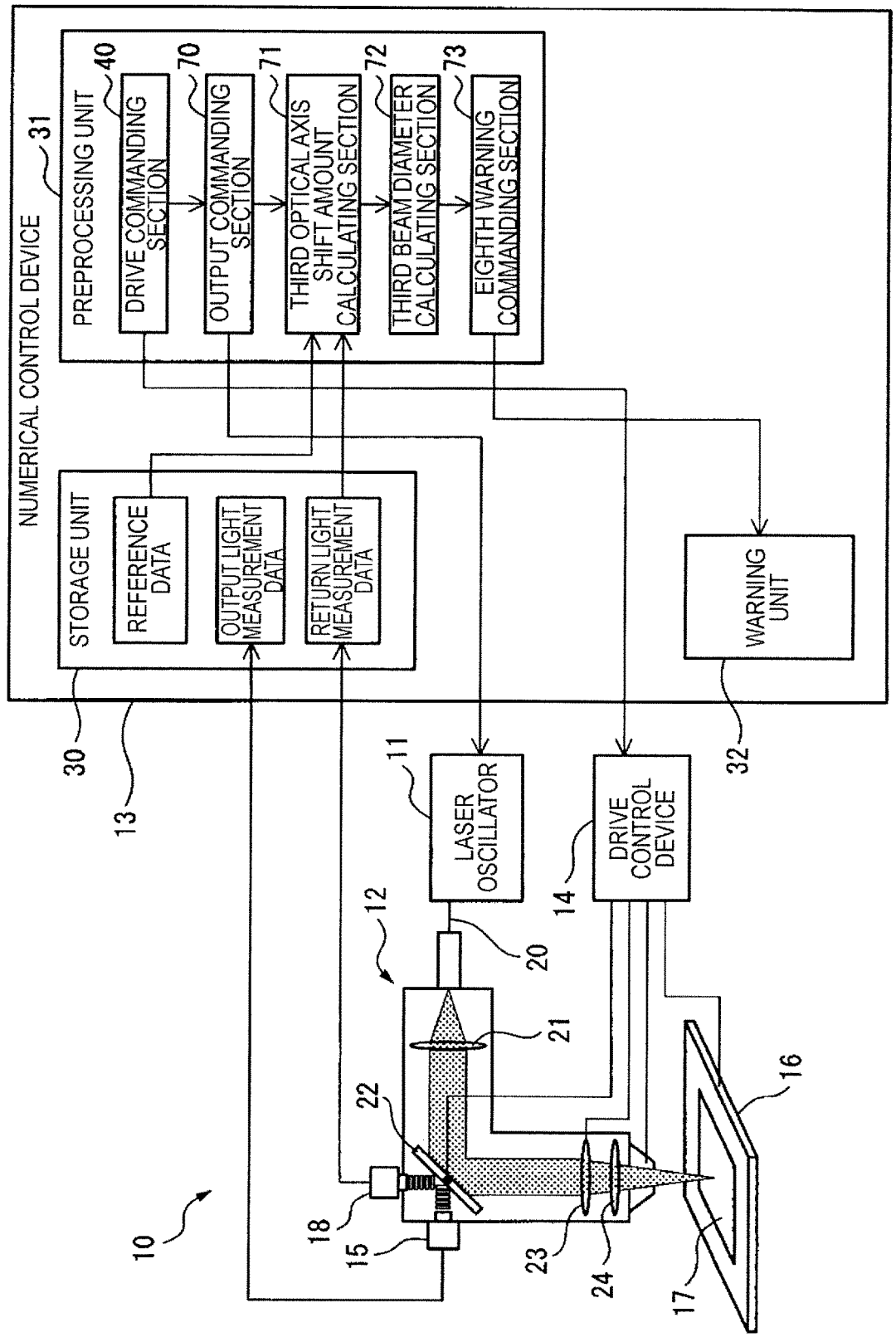
FIG. 9 is a block diagram illustrating a configuration of a numerical control device according to a fourth embodiment.

FIG. 9 is a block diagram illustrating a configuration of a numerical control device according to a fourth embodiment. Only constituent elements different from those of the numerical control device 13 according to the third embodiment will be described below. The preprocessing unit 31 is configured to perform processing of warning of an anomaly (focus shift due to thermal lens effect) in the external optical system 12, and the warning unit 32 is configured to warn of the anomaly in the external optical system 12 in accordance with the processing at the preprocessing unit 31.

The preprocessing unit 31 includes an output commanding section 70 configured to command the laser oscillator 11 to output a laser beam for a relatively long period (e.g., 30 seconds) with such low power as not to melt or deform the reflective plate 17. In an alternative embodiment, the reflective plate 17 may be a half mirror transmitting one portion (e.g., 98%) of the emitting light and reflecting the other portion (e.g., 2%), the laser machining device 10 may further include a laser beam elimination unit is configured to eliminate the laser beam passing through the half mirror, and the output commanding section 70 may be configured to command the laser oscillator 11 to output a laser beam for a relatively short period (e.g., 1 second) with such high power as to be used for laser machining. The external optical system 12 is warmed up by the output commanding section 70, so that in a case where the external optical system 12 is contaminated, a focus shift due to thermal lens effect occurs.

The preprocessing unit 31 further includes a third optical axis shift amount calculating section 71 configured to calculate the amount of a third optical axis shift on the basis of comparison between the return light measurement data and the reference data, a third beam diameter calculating section 72 configured to calculate a third beam diameter on the basis of comparison between the return light measurement data and the reference data, and an eighth warning commanding section 73 configured to command the warning unit 32 to warn of the focus shift due to thermal lens effect on the basis of the third optical axis shift amount or the third beam diameter. In an alternative embodiment, the preprocessing unit 31 may include either one of the third optical axis shift amount calculating section 71 and the third beam diameter calculating section 72.

Figure 10:
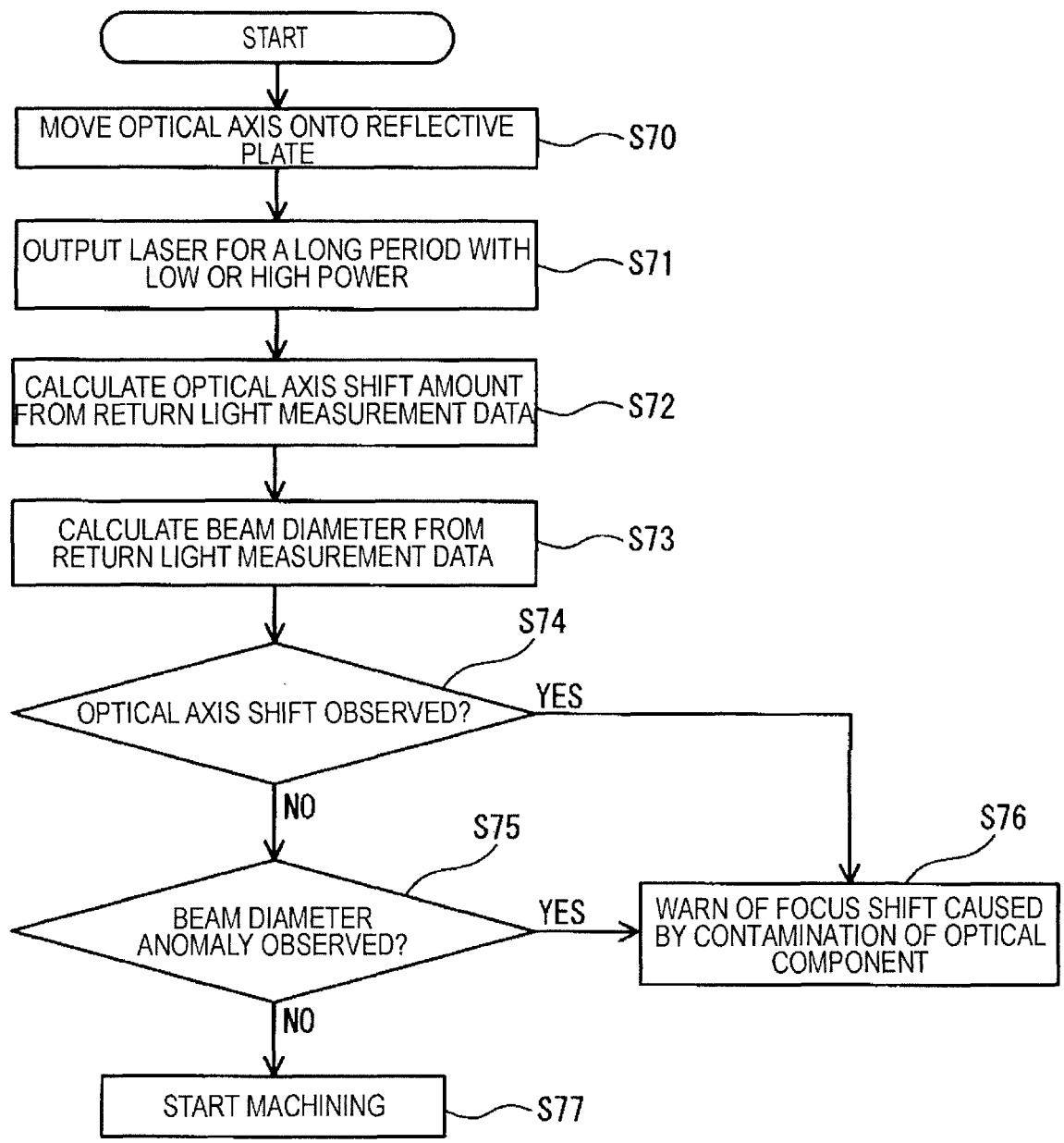
FIG. 10 is a flowchart illustrating operations of a laser machining device according to the fourth embodiment.

FIG. 10 is a flowchart illustrating operations of the laser machining device 10 according to the fourth embodiment. When processing of warning of an anomaly (focus shift) in the external optical system 12 starts before laser machining, a command to move the optical axis of the emitted light onto the reflective plate 17 is issued in Step S70. In Step S71, a command to output a laser beam for a long period with low power or high power is issued. In Step S72, the optical axis shift amount is calculated on the basis of comparison between the return light measurement data and the reference data. In Step S73, the beam diameter is calculated on the basis of comparison between the return light measurement data and the reference data.

In Step S74, if there is an optical axis shift (YES in Step S74), a warning message about the focus shift due to thermal lens effect caused by contamination of an optical component having a curvature is issued in Step S76. In this case, cleaning or replacement of the optical component having a curvature is promoted. On the other hand, if there is no optical axis shift (NO in Step S74), the procedure proceeds to Step S75. Note that whether there is an optical axis shift is determined by determining whether the optical axis position of the return light measurement data is within a predetermined allowable range based on an optical axis position in the reference data.

In Step S75, if there is a beam diameter anomaly (YES in Step S75), a warning message about the focus shift due to thermal lens effect caused by contamination of an optical component having a curvature is issued in Step S76. In this case, cleaning or replacement of the optical component having a curvature is promoted. On the other hand, if there is no beam diameter anomaly (NO in Step S75), the laser machining device 10 starts laser machining in Step S77. Note that whether there is a beam diameter anomaly is determined by determining whether the beam diameter of the return light is within an allowable range based on a beam diameter in the reference data.

According to the fourth embodiment, a warning message about a focus shift due to thermal lens effect caused by contamination of the external optical system 12 can be accurately issued before laser machining. Thus, automated operations can be continued without producing many machining defective products.

A laser machining device 10 according to the fifth embodiment will be described below. In the fifth embodiment, the preprocessing unit 31 includes some or all of the constituent elements of the first to the fourth embodiments. The laser machining device 10 executes some or all of the steps in the flowcharts of the first to the fourth embodiments. The order of the execution is not particularly limited; however, a flowchart starting from the steps of the first embodiment and ending with those of the fourth embodiment is preferable.

According to the fifth embodiment, a warning message about various anomalies (an optical axis shift, a beam diameter anomaly, a mode anomaly, a ghost, contamination of the protective window, and a focus shift due to thermal lens effect) caused by the external optical system 12 can be accurately issued before laser machining. Thus, automated operations can be continued without producing many machining defective products. Furthermore, in a case where the correction can be made, the time of maintenance of the external optical system 12 can be delayed.

A program that can be executed by a computer in the above-described embodiments can be provided having been recorded in a computer-readable non-transitory recording medium, a CD-ROM, or the like. Although some embodiments have been described in this specification, the present invention is not intended to be limited to the above-described embodiments, and it is to be understood that many changes can be made without departing from the scope of the appended claims.

The invention claimed is:

1. A laser machining device configured to warn of an anomaly in an external optical system before laser machining, the laser machining device comprising:
   a laser oscillator;
   an external optical system configured to guide output light in a forward direction from the laser oscillator via a beam splitter;
   a reflective plate disposed perpendicular to an optical axis of emitting light emitting from the external optical system, the reflective plate having a constant reflectance to the emitting light and being fully reflective to the emitted light;
   a return light measurement unit configured to measure intensity distribution of return light reflected off the reflective plate and returned to the external optical system via the beam splitter;
   a storage unit configured to store the intensity distribution of the return light in a normal state, where the external optical system is free of the anomaly that is at least one of optical axis shift, a beam diameter anomaly, a mode anomaly, a ghost, a contamination of a protective window, and a focus shift due to thermal lens effect caused by the external optical system, as a reference data;
   a preprocessing unit configured to perform processing of identifying the anomaly on a basis of comparison between measurement data of the intensity distribution of the return light and the reference data, before laser machining; and
   a warning unit configured to warn of the anomaly in the external optical system in accordance with the processing at the preprocessing unit.

2. The laser machining device of claim 1, further comprising:
   an angle adjustment mechanism configured to allow manual adjustment of an angle of the beam splitter,
   wherein the preprocessing unit includes:
      a first optical axis shift amount calculating section configured to calculate an amount of a first optical axis shift on a basis of the comparison; and
      an adjustment amount calculating section configured to calculate an adjustment amount for angle adjustment of the beam splitter for the angle adjustment mechanism on a basis of the amount of the first optical axis shift, and the warning unit is configured to warn of the optical axis shift together with the adjustment amount.

3. The laser machining device of claim 1, further comprising:

a drive control device configured to control an angle of the beam splitter, wherein the preprocessing unit includes:

a first optical axis shift amount calculating section configured to calculate an amount of a first optical axis shift on a basis of the comparison;

an adjustment amount calculating section configured to calculate an adjustment amount for angle adjustment of the beam splitter by the drive control device on a basis of the amount of the first optical axis shift; and a beam splitter angle adjustment commanding section configured to command the adjustment amount to the drive control device.

4. The laser machining device of claim 2, further comprising:

an output light measurement unit configured to measure intensity distribution of the output light via the beam splitter, wherein the preprocessing unit further includes:

a second optical axis shift amount calculating section configured to calculate an amount of a second optical axis shift on a basis of comparison between measurement data of the intensity distribution of the output light and the reference data; and an anomalous region identifying section configured to identify an anomalous region of the external optical system on a basis of the amount of the first optical axis shift and the amount of the second optical axis shift; and the warning unit is configured to warn of the anomalous region.

5. The laser machining device of claim 1, wherein:

the external optical system includes a focusing lens configured to focus the output light;

the laser machining device further includes a drive control device configured to control a position of the focusing lens; and the preprocessing unit includes:

a first beam diameter calculating section configured to calculate a first beam diameter on a basis of the comparison;

an adjustment amount calculating section configured to calculate an adjustment amount for position adjustment of the focusing lens by the drive control device on a basis of the first beam diameter; and a focusing lens position adjustment commanding section configured to command the drive control device to adjust the position of the focusing lens on a basis of the adjustment amount.

6. The laser machining device of claim 5, further comprising:

an output light measurement unit configured to measure intensity distribution of the output light via the beam splitter;

the preprocessing unit further includes:

a second beam diameter calculating section configured to calculate a second beam diameter on a basis of comparison between measurement data of the intensity distribution of the output light and the reference data; and an anomalous region identifying section configured to identify an anomalous region of the external optical system on a basis of the first beam diameter and the second beam diameter; and the warning unit is configured to warn of the anomalous region.

7. The laser machining device of claim 1, further comprising:

a drive control device configured to drive the protective window in a direction orthogonal to the optical axis of the emitting light; and the preprocessing unit includes:

a contamination identifying section configured to identify the contamination of the protective window on a basis of the comparison;

an adjustment amount calculating section configured to calculate an adjustment amount for position adjustment of the protective window by the drive control device on a basis of a position of the contamination of the protective window; and a window position adjustment commanding section configured to command the drive control device to adjust a position of the protective window on a basis of the adjustment amount.

8. The laser machining device of claim 1, wherein:

the preprocessing unit includes a mode anomaly identifying section configured to identify the mode anomaly of the return light on a basis of the comparison; and the warning unit is configured to warn of the mode anomaly.

9. The laser machining device of claim 1, wherein:

the preprocessing unit includes a ghost identifying section configured to identify the ghost of the return light on a basis of the comparison; and the warning unit is configured to warn of an anomaly of an anti-reflective coating of the protective window.

10. The laser machining device of claim 1, wherein the return light measurement unit is disposed in a position at an angle of 90° with respect to an optical path of the output light in the forward direction.

11. The laser machining device of claim 4, wherein the output light measurement unit is disposed in a position at an angle of 0° with respect to an optical path of the output light in the forward direction.

12. The laser machining device of claim 1, wherein:

the preprocessing unit includes:

an output commanding section configured to command the laser oscillator to perform output until the external optical system is warmed up; and an optical axis shift amount calculating section configured to calculate an amount of the optical axis shift on a basis of the comparison; and the warning unit is configured to warn of the focus shift due to thermal lens effect on a basis of the amount of the optical axis shift.

13. The laser machining device of claim 1, wherein:

the preprocessing unit includes:

an output commanding section configured to command the laser oscillator to perform output until the external optical system is warmed up; and a beam diameter calculating section configured to calculate a beam diameter on a basis of the comparison; and the warning unit is configured to warn of the focus shift due to thermal lens effect on a basis of the beam diameter.

14. The laser machining device of claim 12, wherein:
the reflective plate is a half mirror configured to transmit one portion of the emitting light and reflecting the other portion;
the laser machining device further includes a laser beam elimination unit configured to eliminate a laser beam passing through the half mirror; and
the output commanding section is configured to command the laser oscillator to output the laser beam with such high power as to be used for laser machining until the external optical system is warmed up.

* * * * *